(12) United States Patent
Liu

(10) Patent No.: US 12,233,337 B2
(45) Date of Patent: Feb. 25, 2025

(54) VIRTUAL AIMING CONTROL

(71) Applicant: Tencent Technology (Shenzhen) Company Limited, Guangdong (CN)

(72) Inventor: Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 317 days.

(21) Appl. No.: 17/989,178

(22) Filed: Nov. 17, 2022

(65) Prior Publication Data

US 2023/0082928 A1 Mar. 16, 2023

Related U.S. Application Data

(63) Continuation of application No. PCT/CN2021/142688, filed on Dec. 29, 2021.

(30) Foreign Application Priority Data

Feb. 2, 2021 (CN) .......................... 202110143914.3

(51) Int. Cl.
*A63F 13/53* (2014.01)
*A63F 13/573* (2014.01)
*A63F 13/837* (2014.01)

(52) U.S. Cl.
CPC ............ *A63F 13/53* (2014.09); *A63F 13/573* (2014.09); *A63F 13/837* (2014.09)

(58) Field of Classification Search
CPC ....... A63F 13/53; A63F 13/573; A63F 13/837
See application file for complete search history.

(56) References Cited

U.S. PATENT DOCUMENTS

| 2013/0222247 | A1 | 8/2013 | Liu et al. |
| 2015/0265927 | A1 | 9/2015 | Taylor et al. |
| 2019/0310751 | A1 | 10/2019 | Oshino et al. |
| 2021/0381806 | A1* | 12/2021 | Colachis ............ A61N 1/0456 |
| 2023/0068506 | A1* | 3/2023 | Prodzenko ............ A63F 13/837 |

FOREIGN PATENT DOCUMENTS

| CN | 108815851 A | 11/2018 |
| CN | 110841292 A | 2/2020 |
| CN | 111001159 A | 4/2020 |
| CN | 111111171 A | 5/2020 |
| CN | 112156473 A | 1/2021 |
| CN | 112755526 A | 5/2021 |
| TW | 201524563 A | 7/2015 |

OTHER PUBLICATIONS

International Search Report and Written Opinion in PCT/CN2021/142688, mailed Mar. 28, 2022, 11 pages.
Office Action in TW111207965O0, mailed Nov. 8, 2022, with English Translation, 56 pages.

\* cited by examiner

*Primary Examiner* — Reginald A Renwick
(74) *Attorney, Agent, or Firm* — ArentFox Schiff LLP

(57) ABSTRACT

A virtual aiming control method is provided. In the method, a recoil offset for an aim point of a virtual item is obtained when a shooting operation is performed by the virtual item. A scatter offset for the aim point of the virtual item is determined based on the obtained recoil offset for the aim point of the virtual item. An aim point offset for the aim point of the virtual item is determined based on the obtained recoil offset for the aim point of the virtual item and the determined scatter offset for the aim point of the virtual item. The aim point of the virtual item is shifted based on the aim point offset.

20 Claims, 9 Drawing Sheets

VIRTUAL AIMING CONTROL

RELATED APPLICATIONS

This application is a continuation of International Application No. PCT/CN2021/142688 filed on Dec. 29, 2021, which claims priority to Chinese Patent Application No. 202110143914.3 filed on Feb. 2, 2021. The entire disclosures of the prior applications are hereby incorporated by reference in their entirety.

FIELD OF THE TECHNOLOGY

This application relates to the field of computer technologies, including to a virtual prop control method and apparatus, a terminal, a storage medium, and a computer product.

BACKGROUND OF THE DISCLOSURE

In shooting games, a user controls a virtual object to use a virtual prop to perform a shooting operation. To add verisimilitude to the shooting effect of the virtual prop, a recoil force and a scattering force can be applied to the virtual prop after the shooting operation with the virtual prop. The recoil force may cause the aim point of the virtual prop to shift upward and the scattering force may cause the aim point of the virtual prop to shift randomly. The recoil force and the scattering force together generate an offset of the aim point, which can make the shooting games appear more realistic.

The user can control the aim point of the virtual prop to aim at a target object.

However, in a case that the recoil force of the virtual prop is weak while the scattering force is strong, the scattering force becomes the key factor affecting the offset of the aim point. The offset position of the aim point may become more random because the scattering force is generated randomly. Thus, it may become more difficult to control the aim point, and the human-computer interaction may become less efficient with a less accurate control over the aim point.

SUMMARY

Embodiments of this disclosure provide a virtual aiming control method and apparatus, a terminal, a non-transitory computer-readable storage medium, and a computer program product, which can reduce randomness of an offset position of an aim point so as to enhance human-computer interaction efficiency. The virtual aiming control can be performed for a prop in an example.

As aspect of this disclosure provides a virtual aiming control method. In the method, a recoil offset for an aim point of a virtual item is obtained when a shooting operation is performed by the virtual item. A scatter offset for the aim point of the virtual item is determined based on the obtained recoil offset for the aim point of the virtual item. An aim point offset for the aim point of the virtual item is determined based on the obtained recoil offset for the aim point of the virtual item and the determined scatter offset for the aim point of the virtual item. The aim point of the virtual item is shifted based on the aim point offset.

An aspect of this disclosure further provides a virtual aiming control apparatus, including processing circuitry. The processing circuitry is configured to obtain a recoil offset for an aim point of a virtual item when a shooting operation is performed by the virtual item. The processing circuitry is configured to determine a scatter offset for the aim point of the virtual item based on the obtained recoil offset for the aim point of the virtual item. The processing circuitry is configured to determine an aim point offset for the aim point of the virtual item based on the obtained recoil offset for the aim point of the virtual item and the determined scatter offset for the aim point of the virtual item. The processing circuitry is further configured to shift the aim point of the virtual item based on the aim point offset.

The embodiments of this disclosure further provide a terminal. The terminal includes a processor and a memory, the memory storing at least one computer program, and the instruction being loaded and executed by the processor to implement the virtual aiming or prop control method according to embodiments of this disclosure.

The embodiments of this disclosure further provide a non-transitory computer-readable storage medium, the computer-readable storage medium storing instructions which when executed by a processor cause the processor to implement the virtual aiming or prop control method according to embodiments of this disclosure.

The embodiments of this disclosure further provide a computer program product or computer program, the computer program product or computer program including computer program code, the computer program code being stored in a computer-readable storage medium, and a processor in a terminal reading the computer program code from the computer-readable storage medium and executing the computer program code so that the terminal implements the virtual aiming or prop control method according to embodiments of this disclosure.

Embodiments of this disclosure include a virtual prop control method and apparatus, a terminal, a storage medium, and a computer program product. The horizontal scattering force magnitude is less than the vertical recoil force magnitude, and the ratio between the horizontal scattering force magnitude and the vertical recoil force magnitude is less than 1. Therefore, by adjusting the horizontal scattering force vector based on the ratio, the horizontal scattering force vector can be decreased based on the horizontal recoil force magnitude and the vertical recoil force magnitude, to effectively reduce the impact of the horizontal scattering force vector on the offset vector. Compared with determining the offset vector based on a horizontal scattering force vector generated randomly, this disclosure can reduce the randomness of the offset vector and make it less difficult to control the aim point, thereby improving the accuracy of control of the aim point and the efficiency of human-computer interaction.

DESCRIPTION OF EMBODIMENTS

Figure 1:
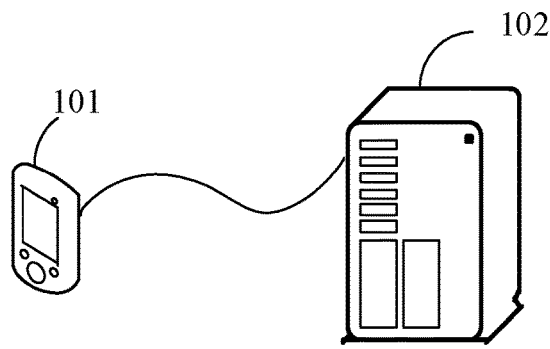
FIG. 1 is a schematic diagram of an implementation environment according to an embodiment of this disclosure.

To make objectives, technical solutions, and advantages of the embodiments of this disclosure clearer, the following further describes exemplary embodiments of this disclosure with reference to the accompanying drawings.

It is to be understood that, the terms "first", "second", and the like used in this disclosure may be used for describing various concepts in this specification. However, the concepts are not limited by the terms unless otherwise specified. The terms are merely used for distinguishing one concept from another concept. For example, without departing from the scope of this disclosure, a first coordinate point may be referred to as a second coordinate point, and similarly, the second coordinate point may be referred to as the first coordinate point.

"At least one" refers to "one or more". For example, "at least one point of intersection" may refer to any integral number of points of intersection, the integral number being greater than or equal to one, for example, one point of intersection, two points of intersection, and three points of intersection. "A plurality of" refers to "two or more". For example, "a plurality of points of intersection" may refer to any integral number of points of intersection, the integral number being greater than or equal to two, for example, two points of intersection or three points of intersection. "Each" refers to "each of at least one". For example, "each point of intersection" may refer to each point of intersection in a plurality of points of intersection. If the "a plurality of points of intersection" refers to three points of intersection, the "each point of intersection" refers to each point of intersection in the three points of intersection.

In the following descriptions, "some embodiments" describe a subset of all possible embodiments. However, it is to be understood that the "some embodiments" may be the same subset or different subsets of all the possible embodiments, and may be combined with each other without conflict.

A virtual game scene involved in the embodiments of this may be used for simulating a virtual three-dimensional space, and the virtual three-dimensional space may be an open space.

A user may control a virtual object to move in the virtual game scene. The virtual object may be represented by a virtual image used for representing the user in the virtual game scene, and the virtual object may be in any form, such as a person or an animal. This is not limited in the embodiments of this disclosure. For example, in a video game, the video game is a first-person shooting game, a third-person shooting game, or other video games that use virtual props for remote interactions. Taking a shooting game as an example, in the virtual game scene, the user may control the virtual object to fall freely, glide, or fall after a parachute is opened in the sky; or to run, jump, creep, and stoop and move forward on the land; or control the virtual object to swim, float, or dive in the ocean. The user may further control the virtual object to take a vehicle to move in the virtual game scene. The user may alternatively control the virtual object to get in and out of a virtual building in the virtual game scene, discover and pick up a virtual prop (such as a projectile) in the game virtual scene, and use the picked virtual prop to fight against another virtual object. For example, the virtual prop may be clothing, a helmet, a bulletproof vest, and a medical product, or may be a virtual prop left after another virtual object is eliminated. Herein, the foregoing scenario is merely used as an example for description, which is not specifically limited in the embodiments of this disclosure.

The embodiments of this disclosure use a video game scene as an example. The user performs an operation on a terminal in advance. After detecting the operation of the user, the terminal downloads a game configuration file of the video game. The game configuration file includes an application program, interface display data, or virtual game scene data, and the like, so that the user invokes the game configuration file while logging in to the video game on the terminal, to render and display an interface of the video game. The user performs a touch operation on the terminal. After detecting the touch operation, the terminal obtains game data corresponding to the touch operation, and renders and displays the game data, where the game data includes virtual game scene data and behavior data of the virtual object in the virtual game scene, and the like.

In an example, when rendering and displaying the virtual game scene, the terminal displays the virtual game scene in full screen, or independently displays a global map in a first preset region on a current display interface while displaying the virtual game scene on the current display interface. In another example, the terminal displays the global map only when detecting a click operation on a preset button. The global map is used for displaying a thumbnail of the virtual game scene, and the thumbnail is used for describing geographic characteristics corresponding to the virtual game scene, for example, topography, a landform, and a geographic location. The terminal may further display a thumbnail of a virtual game scene within a specific distance around the current virtual object on the current display interface. In an example, when detecting a click operation on the global map, the terminal displays a thumbnail of the overall virtual game scene in a second preset region of the current display interface, so that the user can view not only the virtual game scene around the user, but also the overall virtual game scene. In an example, when detecting a zooming operation on the full thumbnail, the terminal zooms and displays the full thumbnail. In some embodiments, display locations and shapes of the first preset region and the second preset region are set according to the user's operation habits. For example, to prevent the virtual game scene from being excessively blocked, the first preset region is a rectangular region in the upper right corner, the lower right corner, the upper left corner, or the lower left corner of the current display interface. The second preset region is a square region on the right or left side of the current display interface. In another example, the first preset region and the second preset region are circular regions or regions of other shapes. Specific display locations and shapes of the preset regions are not limited in the embodiments of this disclosure.

FIG. 1 is a schematic diagram of an implementation environment according to an embodiment of this disclosure. As shown in FIG. 1, the implementation environment includes a terminal 101 and a server 102. In some embodiments, the terminal 101 may be a smartphone, a tablet computer, a notebook computer, a desktop computer, a smart speaker, a smartwatch, or the like, but is not limited thereto. In some embodiments, the server 102 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal 101 and the server 102 are directly or indirectly connected in a wired or wireless communication manner. This is not limited in this disclosure. The server 102 provides a virtual game scene for the terminal 101. Through the virtual game scene provided by the server 103, the terminal 101 can display a virtual game scene interface and displays a virtual object in the virtual game scene interface. The terminal 101 can also control the virtual object game scene based on the virtual game scene interface. The server 102 is configured to control the virtual game scene and perform backend processing based on the terminal 101, and provide backend support for the terminal 101. In some embodiments, the terminal 101 is installed with a game application. The game application can be an application provided by the server 102, or an application in an operating system of the terminal 101, or an application provided by a third party. The terminal 101 and the server 102 interact with each other through the game application.

A virtual prop control method provided in the embodiment of this disclosure can be applied in a video game scene. For example, in a scene where a virtual object uses a virtual prop to shoot, when the user wants to control a virtual object A to use a virtual shooting prop to shoot a virtual object B, the virtual shooting prop points to the virtual object B, and an aim point of the virtual shooting prop is in a body area of the virtual object B. In the virtual game scene, when the virtual object uses the virtual shooting prop to perform a shooting operation, the shooting operation generates a recoil force and a scattering force that act on the virtual shooting prop. As a result, the aim point of the virtual shooting prop has an offset. By using the method provided by the embodiment of this disclosure, the terminal decreases a horizontal scattering force vector based on a size of a recoil force vector, so as to reduce impact of a scattering force vector on an offset vector. Thus, the offset vector may be less random, so that the user controls the aim point of the virtual shooting prop more conveniently, thereby improving the efficiency of aiming at the virtual object B and the efficiency of human-computer interaction.

Figure 2:
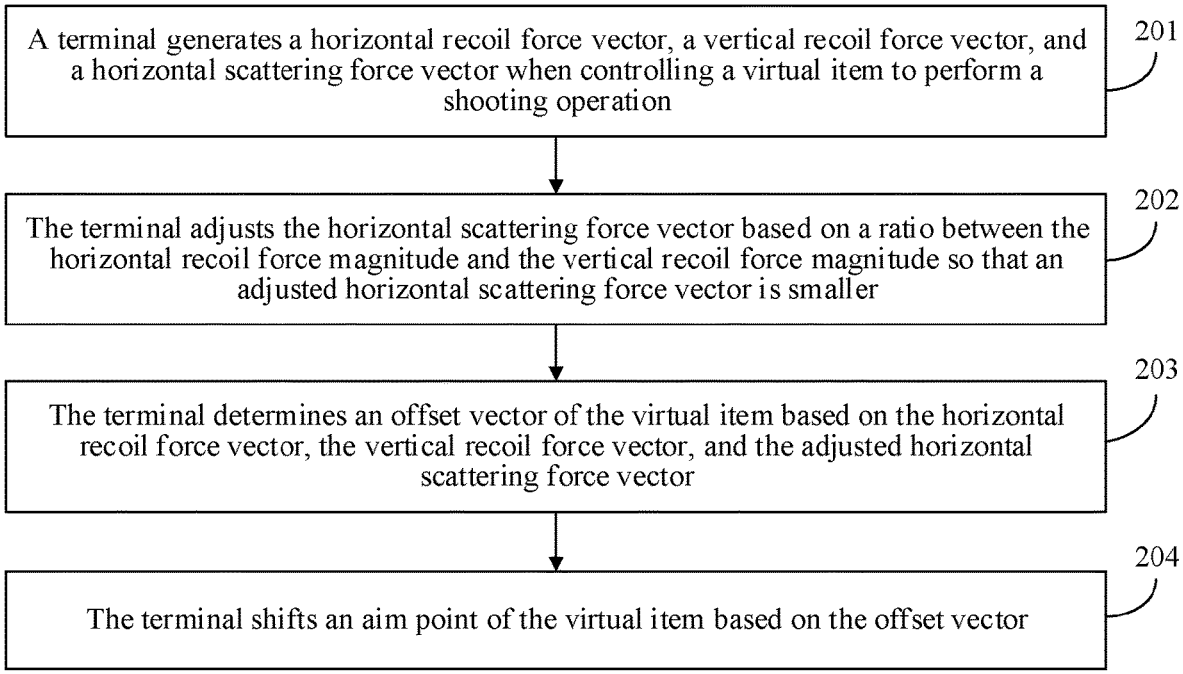
FIG. 2 is a schematic flowchart of a virtual prop control method according to an embodiment of this disclosure.

FIG. 2 is a schematic flowchart of a virtual prop control method according to an embodiment of this disclosure. The embodiment of this disclosure is executed by a terminal. Referring to FIG. 2, in step 201, the terminal generates a horizontal recoil force vector, a vertical recoil force vector, and a horizontal scattering force vector in a case that a virtual prop is controlled to perform a shooting operation. In an example, a horizontal recoil offset, a vertical recoil offset, and a horizontal scatter offset are determined when a shooting operation is performed. The horizontal recoil offset is less than the vertical recoil offset.

A virtual game scene may include a plurality of virtual objects for battling. The terminal displays a virtual game scene interface, the virtual game scene interface including a virtual game scene within an angle of view of a controlled virtual object. The controlled virtual object refers to a virtual object corresponding to a user identifier logged onto the terminal. The terminal controls the controlled virtual object based on an operation by the user. The virtual game scene interface further displays the virtual prop and an aim point of the virtual prop. The virtual prop is a virtual prop capable of shooting and is configured to attack other virtual objects. For example, the virtual prop is a virtual shooting prop (e.g., a virtual bow and arrow, and the like). The aim point of the virtual prop is used for indicating a position to be shot by the virtual prop and assisting the virtual prop in aiming. For example, when the controlled virtual object holds the virtual shooting prop, a position indicated by the aim point of the virtual shooting prop is a shooting position of the virtual shooting prop.

In the virtual game scene, in a process of performing the shooting operation, the virtual prop may generate one or a combination of a horizontal recoil force, a vertical recoil force, and a horizontal scattering force. The horizontal recoil force, the vertical recoil force, and the horizontal scattering force act on the virtual prop and cause the aim point of the virtual prop to generate a corresponding offset. A direction of the horizontal recoil force may be random. The horizontal recoil force may be a horizontal force to the left or a horizontal force to the right. The vertical recoil force is a force vertically upward. Sizes of the horizontal recoil force and the vertical recoil force may be random, but the horizontal recoil force is smaller than the vertical recoil force in an example. A size and direction of the horizontal scattering force may both be random. The horizontal scattering force may be a horizontal force to the left or a horizontal force to the right.

In an embodiment of this disclosure, when controlling the virtual prop to perform a shooting operation, the terminal generates the horizontal recoil force vector, the vertical recoil force vector, and the horizontal scattering force vector. The horizontal recoil force vector is used for representing an offset caused by the generated horizontal recoil force. The vertical recoil force vector is used for representing an offset caused by the generated vertical recoil force. The horizontal scattering force vector is used for representing an offset caused by the generated horizontal scattering force. Each of the generated vectors in an embodiment of this disclosure includes a direction and a magnitude. The direction refers to a direction of the offset and the magnitude refers to a size of the offset. Therefore, the generated horizontal recoil force vector includes the direction of the horizontal recoil force and the magnitude of the horizontal recoil force. The vertical recoil force vector includes the direction of the vertical recoil force and the magnitude of the vertical recoil force. The horizontal scattering force vector includes the direction of the horizontal scattering force and the magnitude of the horizontal scattering force. In some implementations, the vertical recoil force direction is vertically upward. The horizontal recoil force magnitude is less than the vertical recoil force magnitude. The horizontal recoil force magnitude and the horizontal scattering force magnitude are random, and so is the horizontal scattering force direction.

In step 202, the terminal adjusts the horizontal scattering force vector based on a ratio between a horizontal recoil force magnitude and a vertical recoil force magnitude so that an adjusted horizontal scattering force vector is smaller. In an example, the horizontal scatter offset is adjusted based on a ratio between the horizontal recoil offset and the vertical recoil offset such that the horizontal scatter offset is decreased.

The terminal determines the ratio between the horizontal recoil force magnitude and the vertical recoil force magnitude, and adjusts the horizontal scattering force vector based on the ratio to obtain the adjusted horizontal scattering force vector. The horizontal scattering force magnitude is smaller than the vertical recoil force magnitude. Thus, the ratio between the horizontal scattering force magnitude and the vertical recoil force magnitude is less than 1. Therefore, the adjustment of the horizontal scattering force vector based on the ratio may essentially reduce the horizontal scattering force vector. The adjusted horizontal scattering force vector is thus less than the horizontal scattering force vector before the adjustment.

In step 203, the terminal determines an offset vector of the virtual prop based on the horizontal recoil force vector, the vertical recoil force vector, and the adjusted horizontal scattering force vector. In an example, an aim point offset of an aim point is after the shooting operation is determined based on the horizontal recoil offset, the vertical recoil offset, and the adjusted horizontal scatter offset.

After obtaining the adjusted horizontal scattering force vector, the terminal determines the offset vector of the virtual prop based on the horizontal recoil force vector, the vertical recoil force vector, and the adjusted horizontal scattering force vector. The offset vector can represent a direction and a distance of the offset of the virtual prop.

In step 204, the terminal shifts the aim point of the virtual prop based on the offset vector. In an example, the aim point is shifted after the shooting operation based on the aim point offset.

The terminal shifts the aim point of the virtual prop based on the offset vector. Each time the virtual prop performs a shooting operation, the terminal executes steps 201 to 204 to cause the aim point of the virtual prop to shift, so that in a process of continuous shooting operations of the virtual prop, the aim point of the virtual prop has a wobble effect. Controlling the size of the horizontal scattering force vector prevents the aim point from wobbling widely, so that the user can control the aim point of the virtual prop to aim at a shooting object more conveniently.

In the virtual prop control method provided by an embodiment of this disclosure, the horizontal recoil force magnitude is smaller than the vertical recoil force magnitude, and thus the ratio between the horizontal recoil force magnitude and the vertical recoil force magnitude is less than 1. Therefore, by adjusting the horizontal scattering force vector based on the ratio, the horizontal scattering force vector can be reduced based on the horizontal recoil force magnitude and the vertical recoil force magnitude, thereby effectively reducing the impact of the horizontal scattering force vector on the offset vector. Compared with determining the offset vector based on a horizontal scattering force vector generated randomly, this disclosure reduces the randomness of the offset vector and makes it less difficult to control the aim point.

Figure 3:
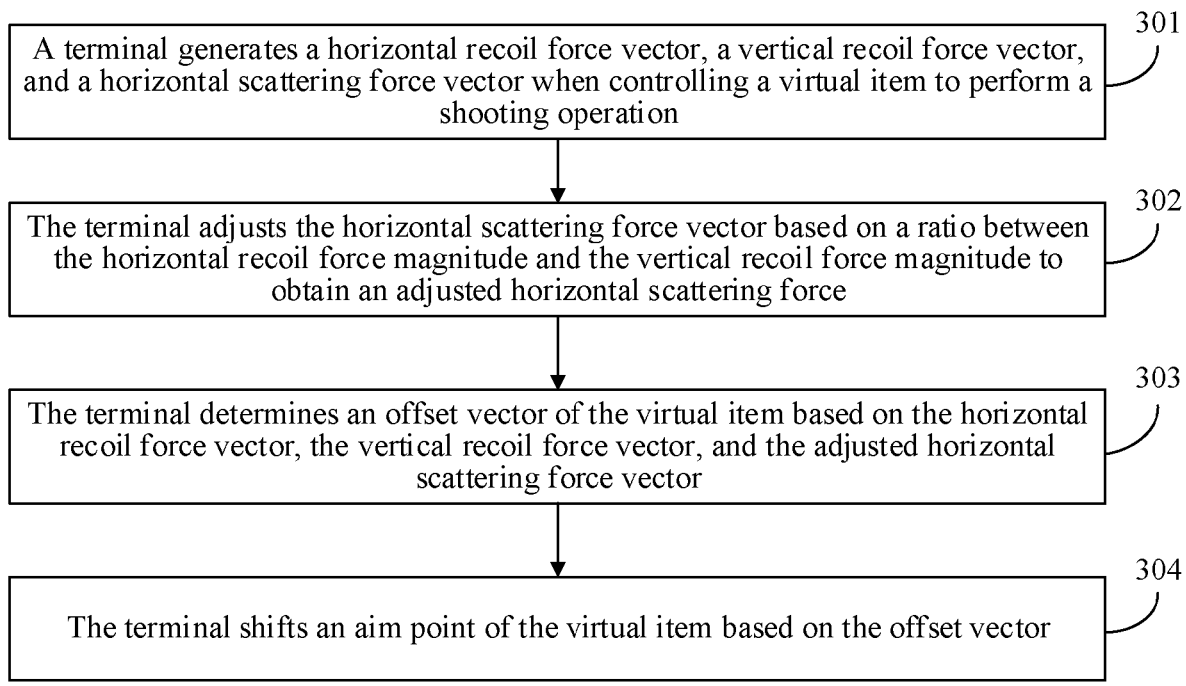
FIG. 3 is a schematic flowchart of a virtual prop control method according to an embodiment of this disclosure.

FIG. 3 is a flowchart of a virtual prop control method according to an embodiment of this disclosure. The embodiment of this disclosure is executed by a terminal. Referring to FIG. 3, in step 301, the terminal generates a horizontal recoil force vector, a vertical recoil force vector, and a horizontal scattering force vector in a case that a virtual prop is controlled to perform a shooting operation.

A virtual game scene may include a plurality of virtual objects for battling. The terminal displays a virtual game scene interface, the virtual game scene interface including a virtual game scene within an angle of view of a controlled virtual object. The terminal controls the controlled virtual object based on an operation of a user. The virtual game scene interface further includes an aim point of the virtual prop. The virtual prop is a prop capable of shooting, and the aim point of the virtual prop is used for indicating a position to be shot by the virtual prop.

In a process of performing the shooting operation, the virtual prop generates a horizontal recoil force, a vertical recoil force, and a horizontal scattering force. The horizontal recoil force, the vertical recoil force, and the horizontal scattering force act on the virtual prop and cause the aim point of the virtual prop to generate a corresponding offset. A direction of the horizontal recoil force is random. The vertical recoil force is a force vertically upward. Sizes of the horizontal recoil force and the vertical recoil force are random, but the horizontal recoil force is smaller than the vertical recoil force. A direction and size of the horizontal scattering force are both random.

In an embodiment of this disclosure, when the virtual prop is controlled to perform the shooting operation in the virtual game scene, the terminal generates a horizontal recoil force vector, a vertical recoil force vector, and a horizontal scattering force vector. The horizontal recoil force vector is used for representing an offset caused by the generated horizontal recoil force. The vertical recoil force vector is used for representing an offset caused by the generated vertical recoil force. The horizontal scattering force vector is used for representing an offset caused by the generated horizontal scattering force. Each of the generated vectors in the embodiment of this disclosure has a direction and a magnitude. That is, the generated horizontal recoil force vector includes a direction of the horizontal recoil force and a magnitude of the horizontal recoil force, the vertical recoil force vector includes a direction of the vertical recoil force and a magnitude of the vertical recoil force, and the horizontal scattering force vector includes a direction of the horizontal scattering force and a magnitude of the horizontal scattering force. The horizontal recoil force direction is random, and the vertical recoil force direction is vertically upward. The horizontal recoil force magnitude is smaller than the vertical recoil force magnitude, and the horizontal scattering force magnitude and the horizontal scattering force direction are random.

In some embodiments, in the virtual game scene, the virtual prop also generates a vertical scattering force in the process of performing the shooting operation. The terminal thus generates the horizontal recoil force vector, the vertical recoil force vector, the horizontal scattering force vector, and a vertical scattering force vector when controlling the virtual prop to perform the shooting operation. The vertical scattering force vector is used for representing the offset caused by the generated vertical scattering force. The vertical scattering force magnitude is random, and so is the vertical scattering force direction. The vertical scattering force direction may be vertically upward or may be vertically downward.

In step 302, the terminal adjusts the horizontal scattering force vector based on a ratio between a horizontal recoil force magnitude and a vertical recoil force magnitude so that an adjusted horizontal scattering force vector is smaller.

The terminal determines the ratio between the horizontal recoil force magnitude and the vertical recoil force magnitude, and adjusts the horizontal scattering force vector based on the ratio to obtain the adjusted scattering force vector. The horizontal scattering force magnitude is less than the vertical recoil force magnitude. Thus, the ratio between the horizontal scattering force magnitude and the vertical recoil force magnitude is less than 1. Therefore, the adjustment of the horizontal scattering force vector based on the ratio is essentially reducing the horizontal scattering force vector. The adjusted horizontal scattering force vector is thus smaller than the horizontal scattering force vector before the adjustment.

Because the horizontal recoil force and the vertical recoil force are not completely randomly generated, the horizontal recoil force and the vertical recoil force mainly cause a vertically upward offset when acting together. Therefore, in the offset caused by the horizontal recoil force, the vertical recoil force, and the horizontal scattering force jointly, the offset caused by the horizontal scattering force is more random. Thus, in the embodiment of this disclosure, randomness of the offset in the horizontal direction is reduced by decreasing the horizontal scattering force vector.

In some embodiments, the terminal determines the ratio between the horizontal recoil force magnitude and the vertical recoil force magnitude, and multiplies the horizontal scattering force vector by the ratio to obtain the adjusted horizontal scattering force vector. Thus, the horizontal scattering force vector is decreased based on the ratio between the horizontal recoil force magnitude and the vertical recoil force magnitude The multiplying the horizontal scattering force vector by the ratio is to multiply the horizontal scattering force magnitude of the horizontal scattering force vector by the ratio, with the horizontal scattering force direction of the horizontal scattering force vector unchanged.

For example, the horizontal recoil force magnitude is x1, and the vertical recoil force magnitude is y1. The horizontal scattering force vector includes the horizontal scattering force magnitude and the horizontal scattering force direction, and the horizontal scattering force magnitude is x2. In this case, an adjusted horizontal scattering force magnitude is $$x_2 \cdot \frac{x_1}{y_1}.$$

The adjusted horizontal scattering force magnitude and the horizontal scattering force direction together form the adjusted horizontal scattering force vector.

In some embodiments, in a case that the ratio between the horizontal recoil force magnitude and the vertical recoil force magnitude is less than a ratio threshold, the terminal adjusts the horizontal scattering force vector based on the ratio to obtain the adjusted horizontal scattering force vector. The ratio threshold is less than 1. For example, the ratio threshold may be a value such as 0.9 or 0.95. In some embodiments, the ratio threshold is set by the terminal, or is sent by another device to the terminal.

The terminal determines the ratio between the horizontal recoil force vector and the vertical recoil force vector, and determines whether the ratio is less than the ratio threshold. If the ratio is less than the ratio threshold, adjusting the horizontal scattering force vector based on the ratio can significantly decrease the horizontal scattering force vector, so as to reduce the randomness of the horizontal scattering force vector. Thus, the terminal adjusts the horizontal scattering force vector based on the ratio to obtain the adjusted horizontal recoil force vector. If the ratio is not less than the ratio threshold, adjusting the horizontal scattering force vector based on the ratio may not significantly decrease the horizontal scattering force vector, and the randomness of the horizontal scattering force vector is not obviously reduced. Thus, the terminal does not need to execute the step of adjusting the horizontal scattering force vector based on the ratio in some examples.

In step 303, the terminal determines an offset vector of the virtual prop based on the horizontal recoil force vector, the vertical recoil force vector, and the adjusted horizontal scattering force vector.

After obtaining the adjusted horizontal scattering force vector, the terminal determines the offset vector of the virtual prop based on the horizontal recoil force vector, the vertical recoil force vector, and the adjusted horizontal scattering force vector. The offset vector can represent a direction and a distance of the offset of the virtual prop.

In some embodiments, the horizontal recoil force vector, the vertical recoil force vector, and the adjusted horizontal scattering force vector each include a direction and a magnitude. Thus, the terminal can determine a vector sum of the horizontal recoil force vector, the vertical recoil force vector, and the adjusted horizontal scattering force vector, and determines the vector sum of the horizontal recoil force vector, the vertical recoil force vector, and the adjusted horizontal scattering force vector as the offset vector. The offset vector includes an offset direction and an offset magnitude.

In some embodiments, in the process of performing the shooting operation in the virtual game scene, the virtual prop further generates a vertical scattering force. The terminal further generates a vertical scattering force vector, the vertical scattering force vector being used for representing an offset caused by the generated vertical scattering force. After obtaining the adjusted horizontal scattering force vector, the terminal determines a vector sum of the horizontal recoil force vector, the vertical recoil force vector, the adjusted horizontal scattering force vector, and the vertical scattering force vector as the offset vector.

In step 304, the terminal shifts the aim point of the virtual prop based on the offset vector.

The terminal shifts the aim point of the virtual prop based on the offset vector. Each time the virtual prop performs a shooting operation, the terminal performs steps 301 to 304 to cause the aim point of the virtual prop to shift, so that in a process of continuous shooting operations of the virtual prop, the aim point of the virtual prop has a wobble effect. Controlling the size of the horizontal scattering force vector prevents the aim point from wobbling widely, so that the user can control the aim point of the virtual prop to aim at a shooting object more conveniently.

In some embodiments, the offset vector includes the offset direction and the offset magnitude. The offset magnitude refers to a size of the offset. The terminal shifts the aim point of the virtual prop along the offset direction based on the offset size indicated by the offset magnitude.

Figure 4:
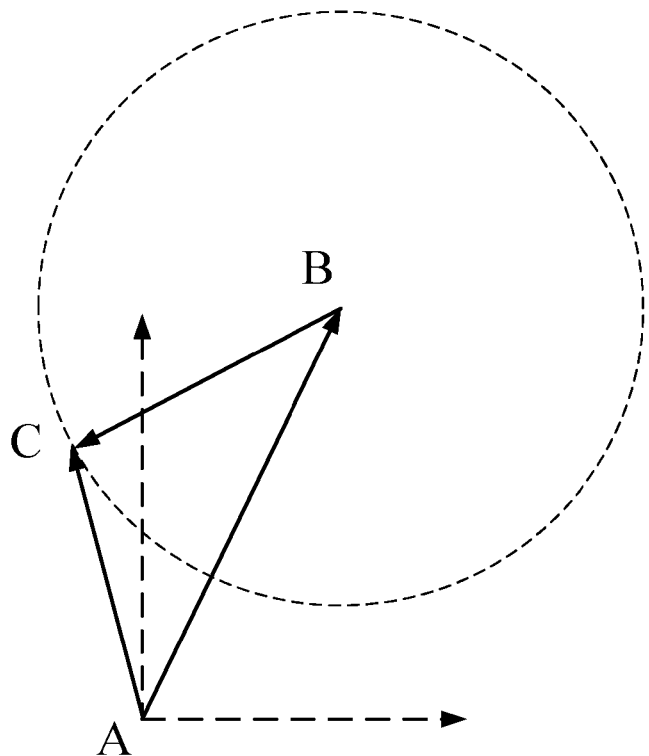
FIG. 4 is a schematic diagram of determining an offset vector according to an embodiment of this disclosure.

FIG. 4 is a schematic diagram of determining an offset vector according to an embodiment of this disclosure. Referring to FIG. 4, an aim point of a virtual prop is located at point A. When performing a shooting operation, a terminal generates a recoil force vector $\overrightarrow{AB}$, and a scattering force vector $\overrightarrow{BC}$. A vector $\overrightarrow{AC}$ is a vector sum of the recoil force vector $\overrightarrow{AB}$ and the scattering force vector $\overrightarrow{BC}$. The vector $\overrightarrow{AC}$ is the offset vector of the virtual prop. Thus, the recoil force and the scattering force cause the aim point of the virtual prop to shift from point A to point C.

Figure 5:
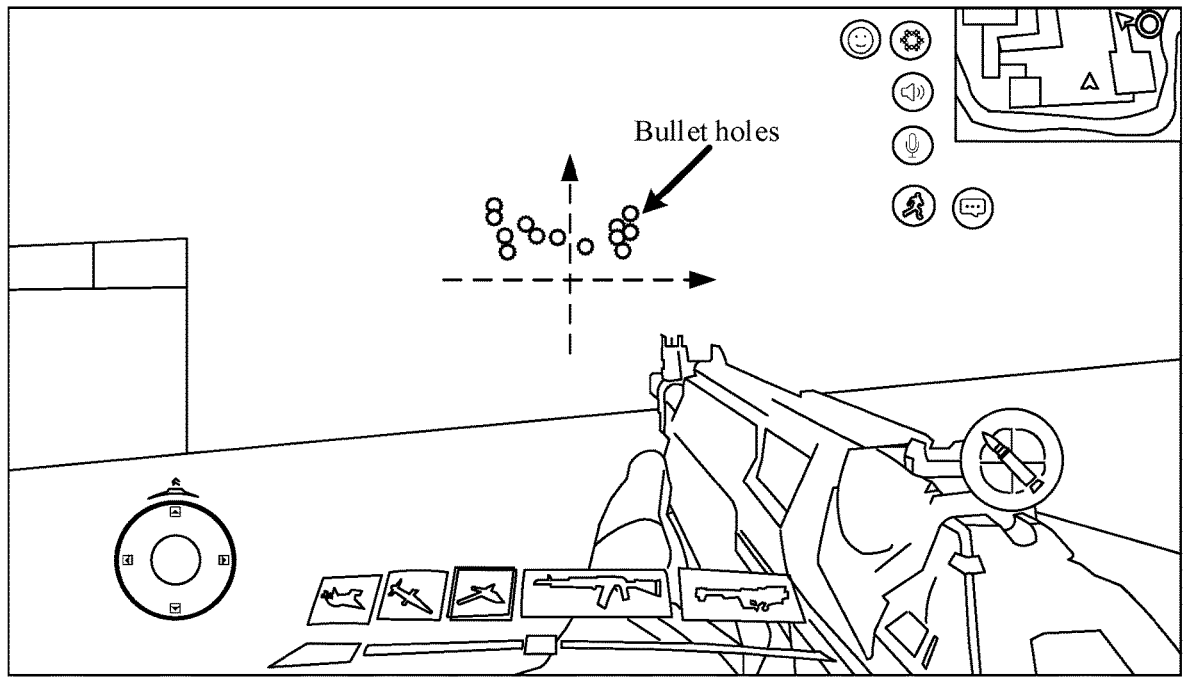
FIG. 5 is a schematic diagram of exemplary bullet holes of shooting by a virtual prop according to an embodiment of this disclosure.

FIG. 5 is a schematic diagram of bullet holes of shooting by a virtual prop according to an embodiment of this disclosure. As shown in FIG. 5, locations of bullet holes generated in the process of continuous shooting of a virtual shooting prop can indicate changes of the location of the aim point of the virtual shooting prop. In a case that the recoil force vector is relatively small while the scattering force vector is relatively large, the horizontal scattering force vector has a greater impact on the offset. Due to randomness of the horizontal scattering force vector, it is possible that one shot is scattered to the left and the other is scattered to the right if the horizontal scattering force vector is not adjusted. As shown in FIG. 5, the aim point of the virtual shooting prop wobbles from side to side. It is difficult for the user to control the aim point. As a result, the bullet holes have a relatively large wobbling amplitude in the horizontal direction, making it more difficult to aim at a shooting object.

Figure 6:
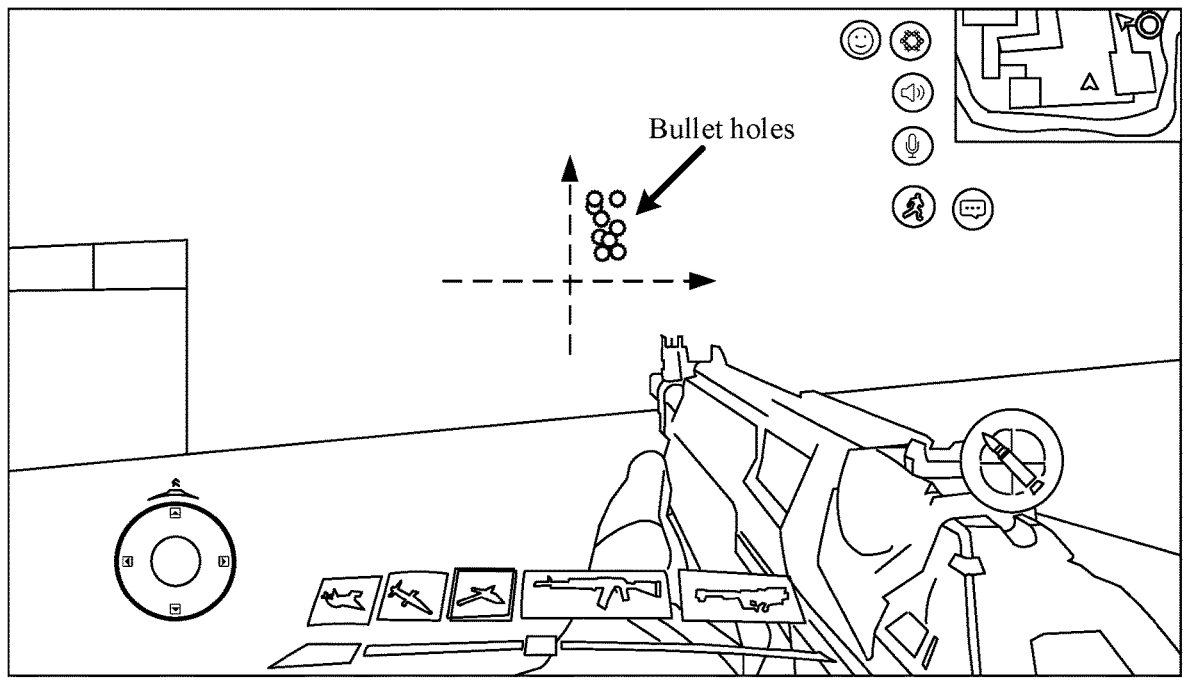
FIG. 6 is a schematic diagram of exemplary bullet holes of shooting by another virtual prop according to an embodiment of this disclosure.

Therefore, in an embodiment of this disclosure, the horizontal scattering force vector is adjusted based on the ratio between the horizontal scattering force magnitude and the vertical recoil force magnitude to reduce the impact of the horizontal scattering force vector on the offset vector and the amplitude of horizontal wobbling of the aim point of the virtual shooting prop. FIG. 6 is a schematic diagram of bullet holes of shooting by a virtual shooting prop after the horizontal scattering force vector is adjusted according to an embodiment of this disclosure. Compared with FIG. 5, FIG. 6 shows that the amplitude of horizontal wobbling of the aim point of the virtual shooting prop is significantly reduced. The horizontal amplitude of the bullet holes is significantly reduced. Thus, it is easier for the user to control the aim point to aim at a virtual object.

In the virtual prop control method provided by the embodiment of this disclosure, the horizontal scattering force magnitude is smaller than the vertical recoil force magnitude, and a ratio between the horizontal scattering force magnitude and the vertical recoil force magnitude is less than 1. Therefore, by adjusting the horizontal scattering force vector based on the ratio, the horizontal scattering force vector can be reduced based on the horizontal recoil force magnitude and the vertical recoil force magnitude, thereby effectively reducing the impact of the horizontal scattering force vector on the offset vector. Compared with determining an offset vector based on a horizontal scattering force vector generated randomly, this disclosure reduces the randomness of the offset vector and makes it less difficult to control the aim point, thereby improving the accuracy of control of the aim point and the efficiency of human-computer interaction.

Figure 7:
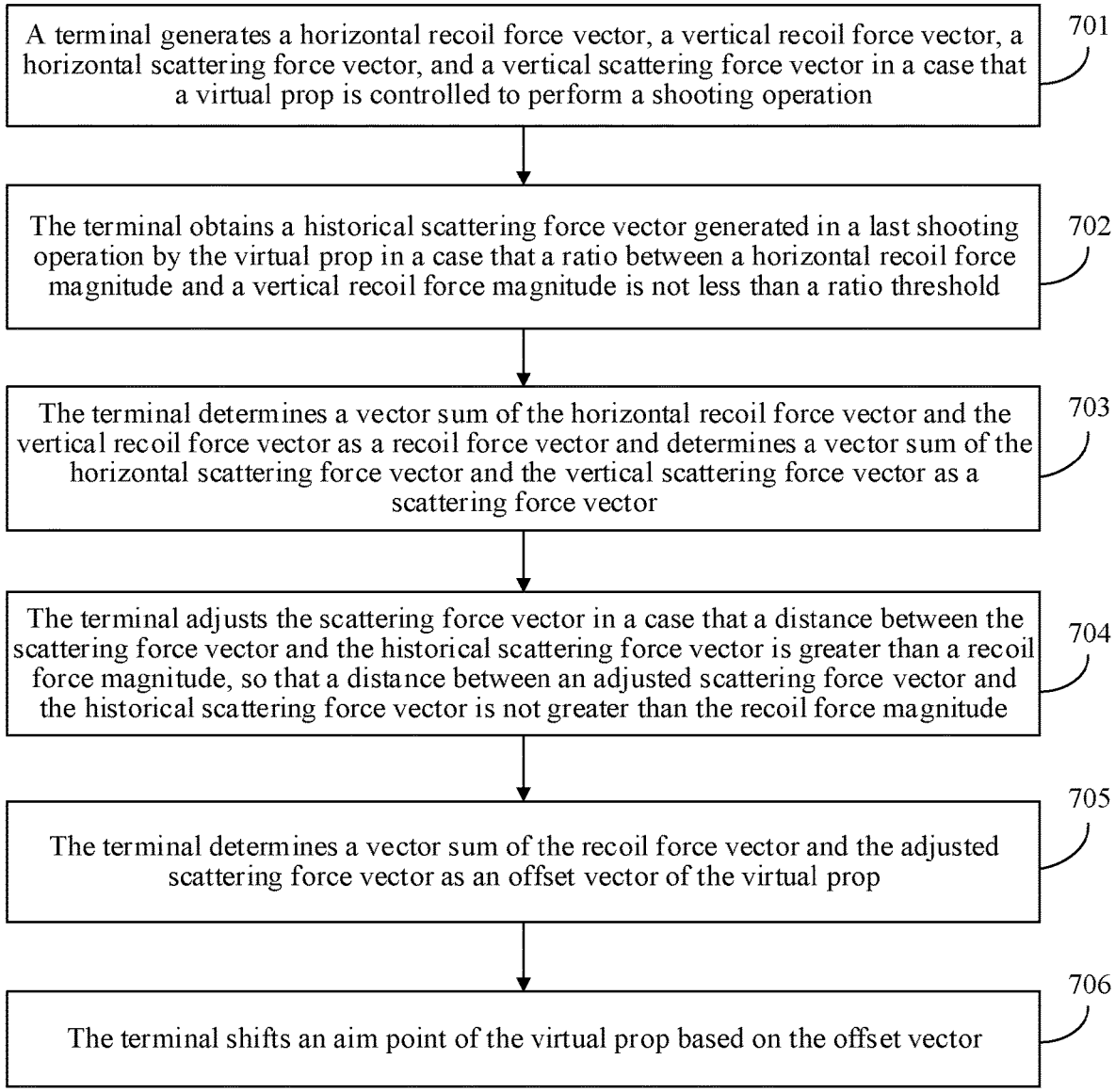
FIG. 7 is a schematic flowchart of another virtual prop control method according to an embodiment of this disclosure.

FIG. 7 is a flowchart of a virtual prop control method according to an embodiment of this disclosure. The embodiment of this disclosure is executed by a terminal. Referring to FIG. 7, in step 701, the terminal generates a horizontal recoil force vector, a vertical recoil force vector, a horizontal scattering force vector, and a vertical scattering force vector in a case that a virtual prop is controlled to perform a shooting operation.

A virtual game scene may include a plurality of virtual objects for battling. The terminal displays a virtual game scene interface, the virtual game scene interface including a virtual game scene within an angle of view of a controlled virtual object. The virtual game scene interface further displays an aim point of the virtual prop. The virtual prop is a prop capable of shooting, and the aim point of the virtual prop is used for indicating a position to be shot by the virtual prop.

In the virtual game scene, in a process of performing the shooting operation, the virtual prop generates a horizontal recoil force, a vertical recoil force, a horizontal scattering force, and a vertical scattering force. The horizontal recoil force, the vertical recoil force, the horizontal scattering force, and the vertical scattering force act on the virtual prop to cause the aim point of the virtual prop to generate a corresponding offset. A direction of the horizontal recoil force may be random. The vertical recoil force may be a force vertically upward. Sizes of the horizontal recoil force and the vertical recoil force may be random, but the horizontal recoil force may be smaller than the vertical recoil force. Directions and sizes of the horizontal scattering force and the vertical scattering force may both be random.

In the embodiment of this disclosure, when controlling the virtual prop to perform the shooting operation in the virtual game scene, the terminal generates the horizontal recoil force vector, the vertical recoil force vector, the horizontal scattering force vector, and the vertical scattering force vector. The horizontal recoil force vector is used for representing an offset caused by the generated horizontal recoil force, the vertical recoil force vector is used for representing an offset caused by the generated vertical recoil force, the horizontal scattering force vector is used for representing an offset caused by the generated horizontal scattering force, and the vertical scattering force vector is used for representing an offset caused by the generated vertical scattering force. Each of the generated vectors in the embodiment of this disclosure has a direction and a magnitude. That is, the generated horizontal recoil force vector includes a direction of the horizontal recoil force and a magnitude of the horizontal recoil force, the vertical recoil force vector includes a direction of the vertical recoil force and a magnitude of the vertical recoil force, and the horizontal scattering force vector includes a direction of the horizontal scattering force and a magnitude of the horizontal scattering force; The horizontal recoil force direction is random, and the vertical recoil force direction is vertically upward. The horizontal recoil force magnitude is smaller than the vertical recoil force magnitude, and the horizontal scattering force magnitude and the horizontal scattering force direction are random.

In some embodiments, in a case that the terminal randomly generates a vector (x, y) in a circle whose radius is 1, $-1 \leq x \leq 1$, and $-1 \leq y \leq 1$. Then the terminal randomly generates a radius r and a scattering force vector (x*r, y*r) based on the vector (x, y) and the radius r.

In step 702, the terminal obtains a historical scattering force vector generated in a last shooting operation by the virtual prop, in a case that a ratio between a horizontal recoil force magnitude and a vertical recoil force magnitude is not less than a ratio threshold.

The terminal determines the ratio between the horizontal recoil force magnitude and the vertical recoil force magnitude. If the ratio between the horizontal recoil force magnitude and the vertical recoil force magnitude is not less than the ratio threshold, the terminal obtains the historical scattering force vector generated when the virtual prop performs the last shooting operation. The ratio threshold is less than 1. For example, the ratio threshold may be a value such as 0.9 or 0.95. In some embodiments, the ratio threshold is set by the terminal, or is sent by another device to the terminal.

The historical scattering force vector is used for representing an offset caused by a scattering force when the virtual prop performs the last shooting operation. The horizontal scattering force vector also includes a direction and a magnitude, and can be decomposed into a horizontal scattering force vector and a vertical scattering force vector, that is, the horizontal scattering force vector is a vector sum of the horizontal scattering force vector and the vertical scattering force vector generated when the virtual prop performs the last shooting operation. In some embodiments, when the virtual prop performs the last shooting operation, the terminal also adjusts the generated horizontal scattering force vector. The historical scattering force vector is then a vector sum of an adjusted horizontal scattering force vector and the vertical scattering force vector.

In step 703, the terminal determines a vector sum of the horizontal recoil force vector and the vertical recoil force vector as a recoil force vector and determines a vector sum of the horizontal scattering force vector and the vertical scattering force vector as a scattering force vector.

The horizontal recoil force vector, the vertical recoil force vector, the horizontal scattering force vector, and the vertical scattering force vector each have a direction and a magnitude. A resultant force of the horizontal recoil force and the vertical recoil force is a recoil force and a resultant force of the horizontal scattering force and the vertical scattering force is a scattering force. Therefore, the terminal determines the vector sum of the horizontal recoil force vector and the vertical recoil force vector, and determines the vector sum of the horizontal recoil force vector and the vertical recoil force vector as the recoil force vector; the terminal determines the vector sum of the horizontal scattering force vector and the vertical scattering force vector, and determines the vector sum of the horizontal scattering force vector and the vertical scattering force vector as the scattering force vector, thereby obtaining the recoil force vector and the scattering force vector. The recoil force vector is used for representing an offset caused by the generated recoil force, and the scattering force vector is used for representing an offset caused by the generated scattering force.

In step 704, the terminal adjusts the scattering force vector in a case that a distance between the scattering force vector and the historical scattering force vector is greater than a recoil force magnitude, so that a distance between an adjusted scattering force vector and the historical scattering force vector is not greater than the recoil force magnitude.

The scattering force vector and the historical scattering force vector each include a direction and a magnitude, and are both vectors. Therefore, the terminal can determine the distance between the scattering force vector and the historical scattering force vector. If the distance between the scattering force vector and the historical scattering force vector is greater than the recoil force magnitude, the terminal adjusts the scattering force vector to obtain an adjusted scattering force vector, so that the distance between the adjusted scattering force vector and the historical scattering force vector is not greater than the recoil force magnitude. Therefore, the current scattering force vector is adjusted by using the current recoil force magnitude, so that the distance between the adjusted scattering force vector and a previous scattering force vector is not greater than the recoil force magnitude. In this way, the scattering force vector is limited based on the recoil force magnitude. The scattering force vector is less random, and the impact of the scattering force vector on an offset vector is effectively reduced, to reduce the randomness of the offset vector. This avoids an excessively large distance between the current scattering force vector and the previous scattering force vector and prevents the aim point of the virtual prop from wobbling widely. Thus, it is easier for a user to control the aim point of the virtual prop to aim at a shooting object. The control of the aim point is more accurate, and the efficiency of human-computer interaction is enhanced.

In some embodiments, the terminal maps the scattering force vector to a first coordinate point, and maps the historical scattering force vector to a second coordinate point, so as to generate a circle with the second coordinate point as a center and the recoil force magnitude as a radius. In a case that the first coordinate point is located outside the circle, the scattering force vector is adjusted so that the distance between the adjusted scattering force vector and the historical scattering force vector is not greater than the recoil force magnitude.

The terminal maps the scattering force vector to the first coordinate point, and maps the historical scattering force vector to the second coordinate point. A distance between the first coordinate point and the second coordinate point is the distance between the scattering force vector and the historical scattering force vector. Because the radius of the circle is the recoil force magnitude, if the first coordinate point is located outside the circle, it indicates that the distance between the first coordinate point and the second coordinate point is greater than the recoil force magnitude. This indicates that the distance between the scattering force vector and the historical scattering force vector is greater than the recoil force magnitude. The terminal thus adjusts the scattering force vector so that the distance between the adjusted scattering force vector and the historical scattering force vector is not greater than the recoil force magnitude.

In some embodiments, the terminal determines a horizontal coordinate based on the horizontal scattering force magnitude and the horizontal scattering force direction, and determines a vertical coordinate based on the vertical scattering force magnitude and the vertical scattering force direction. The terminal determines a coordinate point indicated by the horizontal coordinate and the vertical coordinate as the first coordinate point. The terminal determines an absolute value of the horizontal coordinate based on the horizontal scattering force magnitude, and determines whether the horizontal coordinate is positive or negative based on the horizontal scattering force direction. If the horizontal scattering force direction is horizontal to the left, the horizontal coordinate is a negative number. If the horizontal scattering force direction is horizontal to the right, the horizontal coordinate is a positive number. The terminal determines an absolute value of the vertical coordinate based on the vertical scattering force magnitude, and determines whether the vertical coordinate is positive or negative based on the vertical scattering force direction. If the vertical scattering force direction is vertically upward, the vertical coordinate is a positive number. If the vertical scattering force direction is vertically downward, the vertical coordinate is a negative number. For example, the generated horizontal scattering force magnitude is 5, the horizontal scattering force direction is horizontal to the left, the vertical scattering force magnitude is 8, and the vertical scattering force direction is vertically upward, the first coordinate point is (−5, 8).

A process of mapping the historical scattering force vector to the second coordinate point is the same as a process of mapping the scattering force vector to the first coordinate point. Details are not described herein again.

In some embodiments, in a case that the first coordinate point is located outside the circle, the terminal generates a ray that starts at the second coordinate point and passes through the first coordinate point. The terminal maps a point of intersection between the circle and the ray to be the adjusted scattering force vector.

If the first coordinate point is located outside the circle, the terminal draws a ray that starts from the second coordinate point in a direction towards the first coordinate point, and the ray passes through the first coordinate point. The second coordinate point is located within the circle while the first coordinate point is located outside the circle. Thus, there is a point of intersection between the ray and the circle, and the terminal maps the point of intersection to be the adjusted scattering force vector. The distance between the adjusted scattering force vector and the historical scattering force vector is equal to the recoil force magnitude, so that the distance between the adjusted scattering force vector and the historical scattering force vector is not greater than the recoil force vector.

In some embodiments, the terminal maps the point of intersection between the circle and the ray to be the adjusted scattering force vector through the following process: the terminal determines a corresponding horizontal coordinate and vertical coordinate of the point of intersection between the circle and the ray, determines an adjusted horizontal scattering force magnitude and horizontal scattering force direction based on the horizontal coordinate, forms the adjusted horizontal scattering force magnitude and horizontal scattering force direction into the adjusted horizontal scattering force vector, determines an adjusted vertical scattering force magnitude and vertical scattering force direction, forms the adjusted vertical scattering force magnitude and vertical scattering force direction into the adjusted vertical scattering force, and determines a vector sum of the adjusted horizontal scattering force vector and the adjusted vertical scattering force vector as the adjusted scattering force.

The terminal determines the absolute value of the horizontal coordinate as the adjusted horizontal scattering force magnitude, and determines the horizontal scattering force direction based on whether the horizontal coordinate is positive or negative. If the horizontal coordinate is a positive number, the horizontal scattering force direction is horizontal to the right. If the horizontal coordinate is a negative number, the horizontal scattering force direction is horizontal to the left. Thus, the adjusted horizontal scattering force magnitude and horizontal scattering force direction are formed into the horizontal scattering force vector. The terminal determines the absolute value of the vertical coordinate as the adjusted vertical scattering force magnitude, and determines the vertical scattering force direction based on whether the vertical coordinate is positive or negative. If the vertical coordinate is a positive number, the vertical scattering force direction is vertically upward. If the vertical coordinate is a negative number, the vertical scattering force direction is vertically downward. Thus, the adjusted vertical scattering force magnitude and vertical scattering force direction are formed into the horizontal scattering force vector. For example, if the point of intersection between the circle and the ray is (10, −5), the horizontal scattering force magnitude is 10, the horizontal scattering force direction is horizontal to the right, the vertical scattering force magnitude is 5, and the vertical scattering force direction is vertically downward.

In some embodiments, in a case that the first coordinate point is located outside the circle, the terminal generates a straight line that passes through the first coordinate point and the second coordinate point, and determines two points of intersection between the circle and the straight line. A point of intersection closer to the first coordinate point in the two points of intersection is mapped by the terminal to be the adjusted scattering force vector.

The first coordinate point is located outside the circle, and the second coordinate point is located within the circle. Thus, there are two points of intersection between the circle and the straight line that passes through the first coordinate point and the second coordinate point. To avoid excessive adjustment on the scattering force vector, the terminal selects the point of intersection that is closer to the first coordinate point in the two points of intersection. That is, the point of intersection located between the first coordinate point and the second coordinate point is selected and mapped to be the adjusted scattering force vector.

In the virtual game scene, if the distance between the scattering force vector and the historical scattering force vector is not greater than the recoil force magnitude, the terminal does not need to adjust the scattering force vector, but directly determines a vector sum of the recoil force vector and the scattering force vector as the offset vector of the virtual prop, and shifts the aim point of the virtual prop based on the offset vector. In some embodiments, the terminal maps the scattering force vector to the first coordinate point and maps the historical scattering force vector to the second coordinate point to generate a circle with the second coordinate point as a center and the recoil force magnitude as a radius. In the case that the first coordinate point is located inside the circle, the terminal does not need to adjust the scattering force vector.

Figure 8:
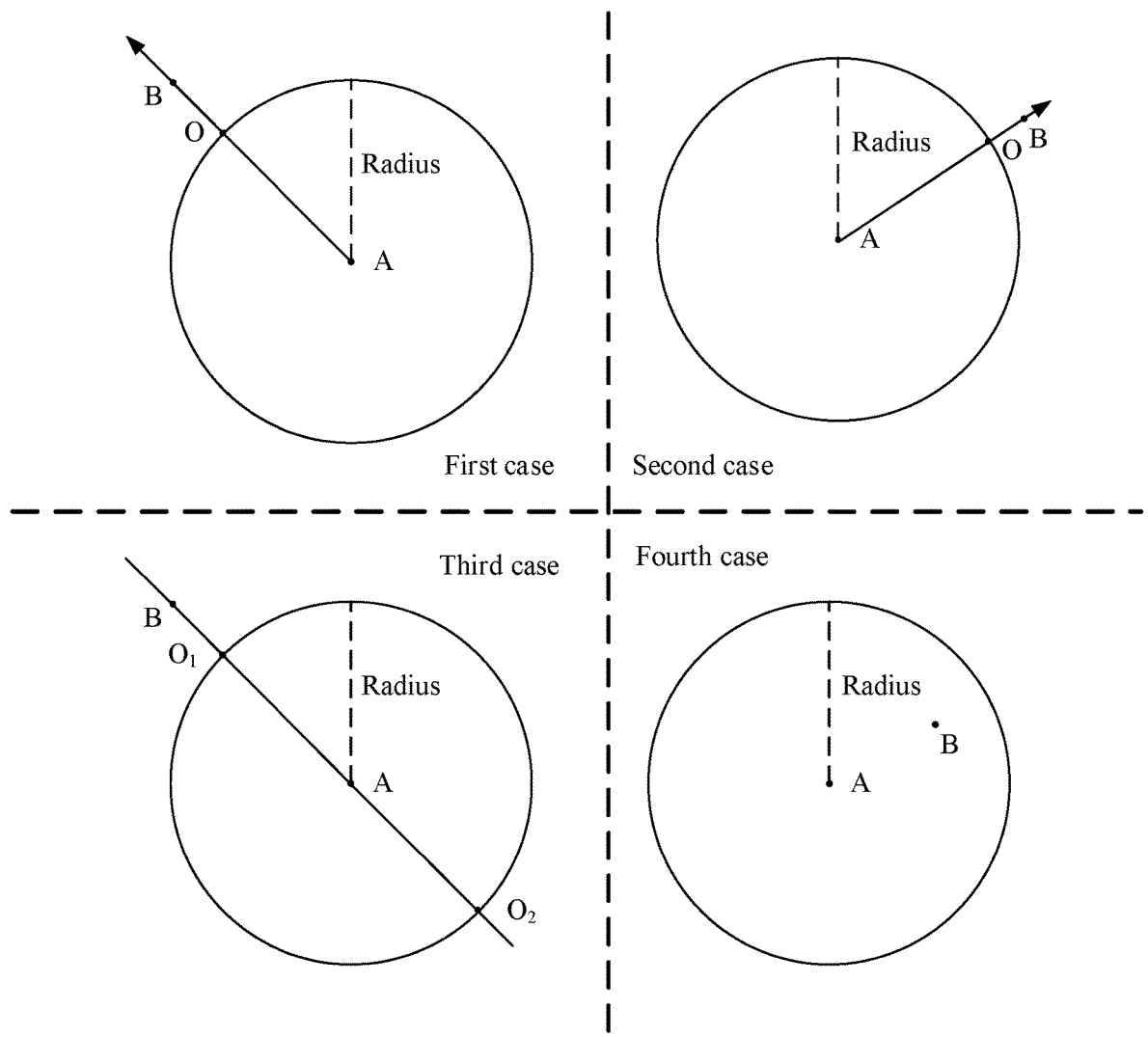
FIG. 8 is a schematic diagram of a first coordinate point, a second coordinate point, and a circle according to an embodiment of this disclosure.

FIG. 8 is a schematic diagram of a first coordinate point, a second coordinate point, and a circle according to an embodiment of this disclosure. Referring to FIG. 8, point A is the second coordinate point, and point B is the first coordinate point. The circle in FIG. 8 is a circle with point A as a center and the recoil force magnitude as a radius. In the first case and second case, point B is located outside the circle. Thus, the terminal determines a ray that starts at point A and passes through point B. The ray and the circle intersect at point O. The terminal determines a coordinate value of point A, and maps point O to be the adjusted scattering force vector based on the coordinate value of point O.

Alternatively, as shown in the third case, point B is located outside the circle, the terminal determines a straight line that passes through point A and point B, and intersects with the circle at point O1 and point O2. Point O1 that is closer to point B is mapped by the terminal to be the adjusted scattering force vector.

Alternatively, as shown in the fourth case, point B is located within the circle. Thus, the terminal does not need to perform the foregoing operation to adjust the scattering force vector.

In step 705, the terminal determines a vector sum of the recoil force vector and the adjusted scattering force vector as the offset vector of the virtual prop.

In the virtual game scene, the offset of the virtual prop may be caused by a combined action of the recoil force and the scattering force. The recoil force vector and the adjusted scattering force vector may both be used for representing the generated offset. Thus, the terminal determines a vector sum of the recoil force vector and the adjusted scattering force vector and determines the sum as the offset vector of the virtual prop.

In step 706, the terminal shifts the aim point of the virtual prop based on the offset vector.

In the virtual game scene, the terminal shifts the aim point of the virtual prop based on the offset vector. Each time the virtual prop performs a shooting operation, the terminal performs steps 701 to 706 to cause the aim point of the virtual prop to shift, so that in a process of continuous shooting operations of the virtual prop, the aim point of the virtual prop has a wobble effect. Moreover, by controlling the scattering force vector, it prevents the aim point from wobbling widely, so that the user controls the aim point of the virtual prop to aim at the shooting object conveniently.

In some embodiments, the offset vector includes an offset direction and an offset magnitude. The offset magnitude refers to a size of the offset. The terminal shifts the aim point of the virtual prop along the offset direction based on the offset size indicated by the offset magnitude.

Figure 9:
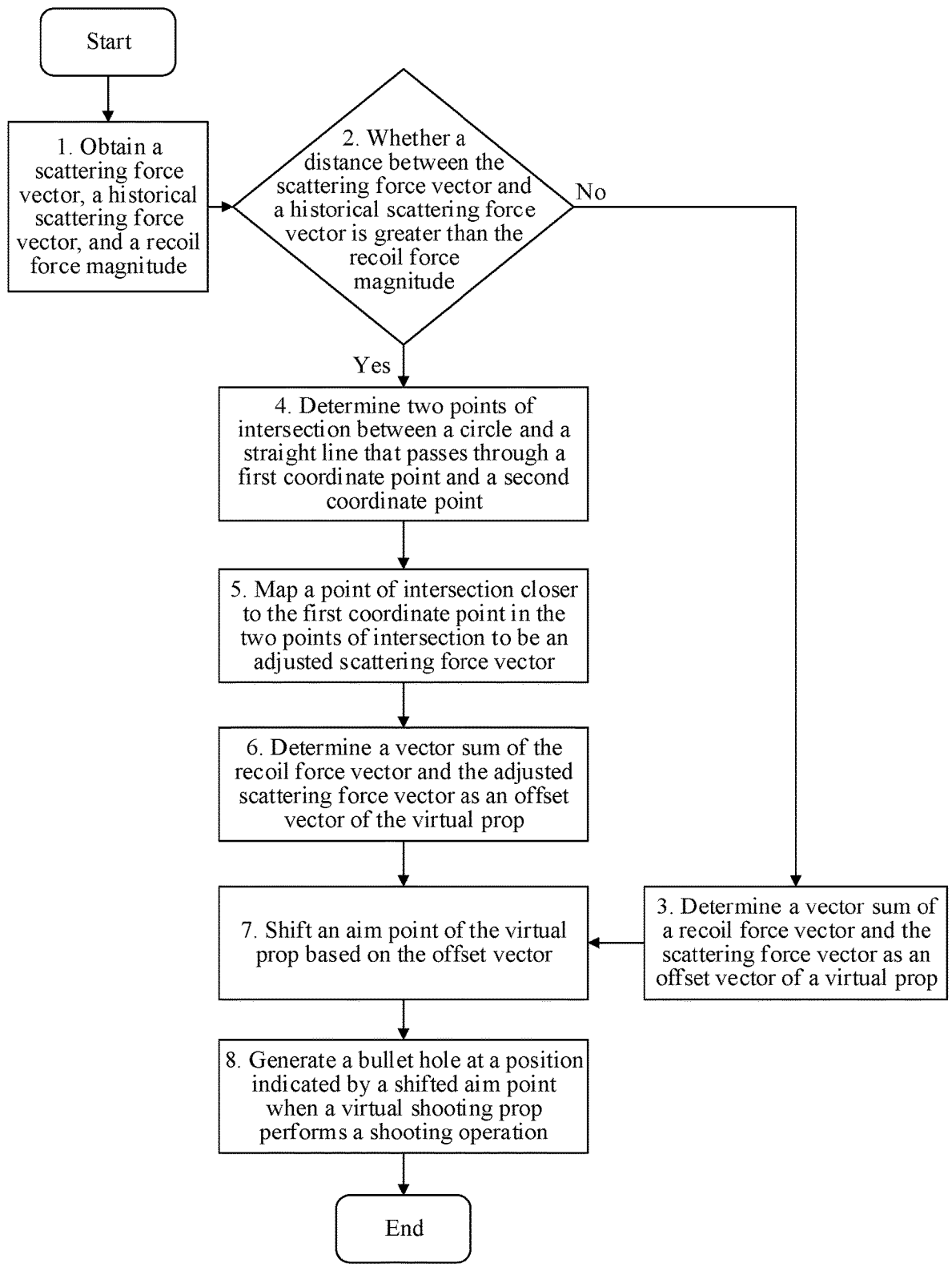
FIG. 9 is a schematic flowchart of another virtual prop control method according to an embodiment of this disclosure.

FIG. 9 is a schematic flowchart of another virtual prop control method according to an embodiment of this disclosure. Referring to FIG. 9, the method includes:

Step 1. A terminal determines a scattering force vector, a historical scattering force vector, and a recoil force magnitude corresponding to a virtual shooting prop.

Step 2. The terminal determines whether a distance between the scattering force vector and the historical scattering force vector is greater than the recoil force magnitude, and the terminal performs step 3 if the distance is not greater than the recoil force; the terminal performs step 4 if the distance is greater than the recoil force magnitude.

Step 3. The terminal determines a vector sum of a recoil force vector and the scattering force vector as an offset vector of the virtual shooting prop, and then directly performs step 7.

Step 4. The terminal maps the scattering force vector to a first coordinate point, maps the historical scattering force vector to a second coordinate point, and determines two points of intersection between a circle and a straight line that passes through the first coordinate point and the second coordinate point, where the circle refers to a circle with the second coordinate point as a center and the recoil force magnitude with a radius.

Step 5. The terminal maps a point of intersection closer to the first coordinate point in the two points of intersection to be an adjusted scattering force vector.

Step 6. The terminal determines a vector sum of the recoil force vector and the adjusted scattering force vector as an offset vector of the virtual shooting prop.

Step 7. The terminal shifts an aim point of the virtual shooting prop based on the offset vector.

Step 8. The terminal generates a bullet hole at a position indicated by a shifted aim point when the virtual shooting prop performs a shooting operation.

In the virtual prop control method provided by the embodiment of this disclosure, in a virtual game scene, the current scattering force vector is adjusted based on the current recoil force magnitude of this time, so that a distance between the adjusted scattering force vector and a previous scattering force vector is not greater than the recoil force magnitude. In this way, the scattering force vector is limited based on the recoil force magnitude, thereby effectively reducing the impact of the scattering force vector on the offset vector. Compared with determining the offset vector based on a scattering force vector generated randomly, this disclosure may reduce the randomness of the offset vector. This avoids an excessively large distance between the current scattering force vector and the previous scattering force vector, and helps prevent the aim point of the virtual prop from wobbling widely. It is easier for a user to control the aim point of the virtual prop to aim at a shooting object.

In addition, due to the randomness of the first coordinate point and the second coordinate point, a point of intersection between the circle and a ray that passes through the first coordinate point and the second coordinate point is mapped to be the adjusted scattering force vector, which ensures the randomness of the adjusted scattering force vector while correcting a range of the scattering force vector.

It is to be understood that, the foregoing embodiment in FIG. 3 only describes a process of adjusting the horizontal scattering force vector based on the ratio between the horizontal recoil force magnitude and the vertical recoil force magnitude to control the horizontal scattering force vector. In this way, the horizontal scattering force magnitude is adjusted based on the horizontal recoil force magnitude and the vertical recoil force magnitude. The foregoing embodiment in FIG. 7 only describes a process of adjusting the scattering force vector so that the distance between the adjusted scattering force vector and the historical scattering force vector is not greater than the recoil force magnitude, In this way, the size of the scattering force vector is adjusted based on the recoil force magnitude, thereby correcting the range of the scattering force vector. In another embodiment, the embodiment in FIG. 3 and the embodiment in FIG. 7 can be combined, that is, the terminal determines whether the ratio between the horizontal recoil force magnitude and the vertical recoil force magnitude is less than the ratio threshold. If the ratio is less than the ratio threshold, the terminal performs steps 302 to 304. If the ratio is not less than the ratio threshold, the terminal performs steps 702 to 706.

Figure 10:
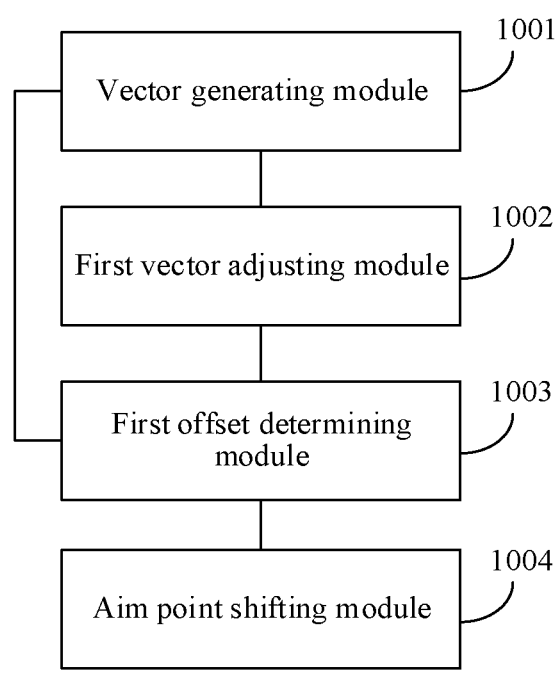
FIG. 10 is a schematic structural diagram of a virtual prop control apparatus according to an embodiment of this disclosure.

FIG. 10 is a schematic structural diagram of a virtual prop control apparatus according to an embodiment of this disclosure. Referring to FIG. 10, the apparatus includes a vector generating module 1001, a first vector adjusting module 1002, a first offset determining module 1003, and an aim point shifting module 1004. One or more modules, submodules, and/or units of the apparatus can be implemented by processing circuitry, software, or a combination thereof, for example.

The vector generating module 1001 is configured to generate a horizontal recoil force vector, a vertical recoil force vector, and a horizontal scattering force vector in a case that a virtual prop is controlled to perform a shooting operation, each of the generated vectors having a direction and a magnitude, a vertical recoil force direction being vertically upward and a horizontal recoil force magnitude being less than a vertical recoil force magnitude.

The first vector adjusting module 1002 is configured to adjust the horizontal scattering force vector based on a ratio between the horizontal recoil force magnitude and the vertical recoil force magnitude so that an adjusted horizontal scattering force vector is smaller.

The first offset determining module 1003 is configured to determine an offset vector of the virtual prop based on the horizontal recoil force vector, the vertical recoil force vector, and the adjusted horizontal scattering force vector.

The aim point shifting module 1004 is configured to shift an aim point of the virtual prop based on the offset vector.

In the virtual prop control apparatus provided by the embodiment of this disclosure, the horizontal recoil force magnitude is smaller than the vertical recoil force magnitude, and the ratio between the horizontal recoil force magnitude and the vertical recoil force magnitude is less than 1. Therefore, by adjusting the horizontal scattering force vector based on the ratio, the horizontal scattering force vector can be reduced based on the horizontal recoil force magnitude and the vertical recoil force magnitude, thereby effectively reducing the impact of the horizontal scattering force vector on the offset vector. Compared with determining an offset vector based on a horizontal scattering force vector generated randomly, this disclosure reduces the randomness of the offset vector and makes it less difficult to control the aim point. thereby improving the efficiency of human-computer interaction.

Figure 11:
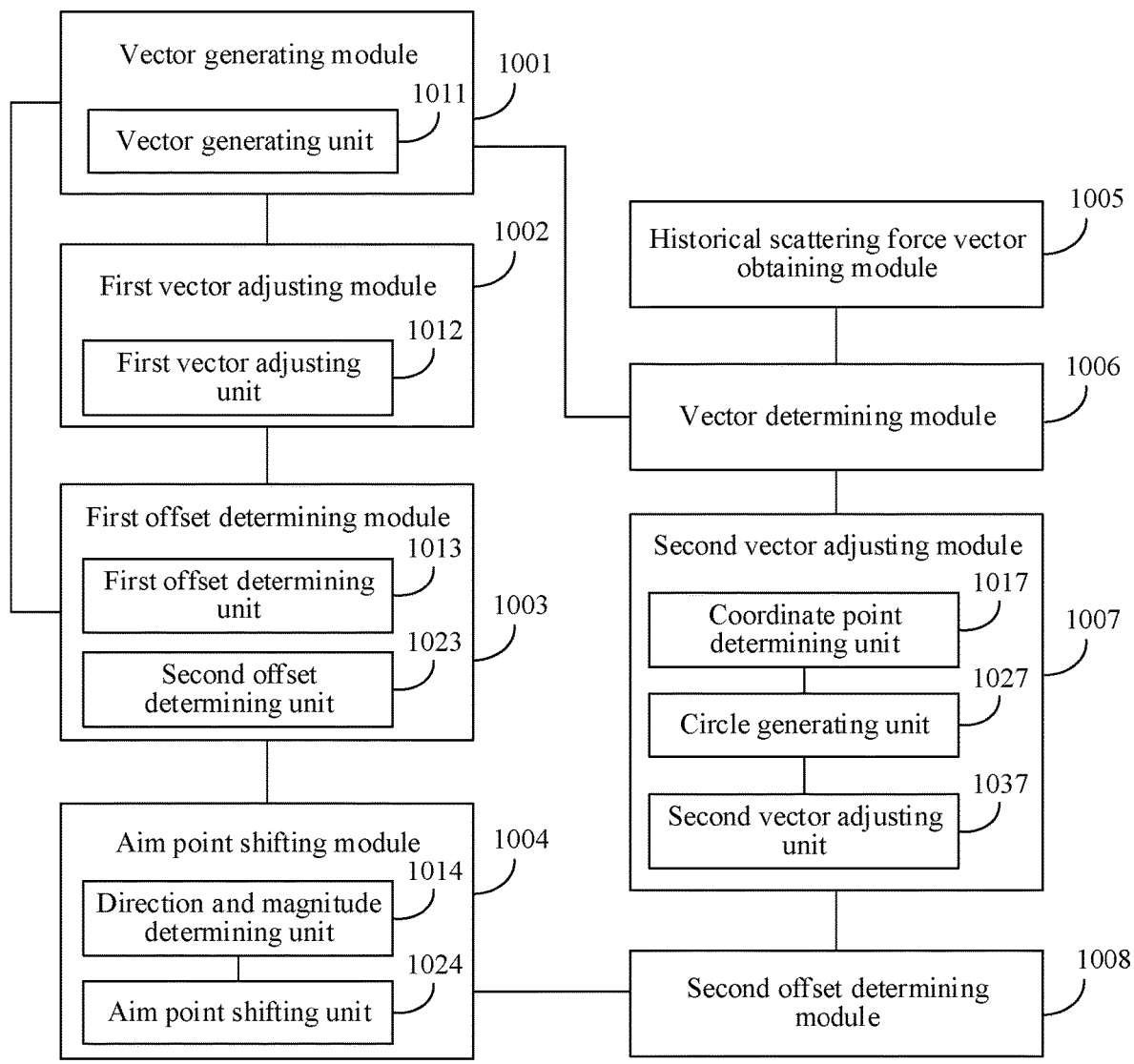
FIG. 11 is a schematic structural diagram of another virtual prop control apparatus according to an embodiment of this disclosure.

In some embodiments, referring to FIG. 11, the first offset determining module 1003 includes a first offset determining unit 1013, configured to determine a vector sum of the horizontal recoil force vector, the vertical recoil force vector, and the adjusted horizontal scattering force vector as the offset vector.

In some embodiment, referring to FIG. 11, the vector generating module 1001 includes a vector generating unit 1011, configured to generate the horizontal recoil force vector, the vertical recoil force vector, the horizontal scattering force vector, and a vertical scattering force vector.

The first offset determining module 1003 includes a second offset determining unit 1023, configured to determine a vector sum of the horizontal recoil force vector, the vertical recoil force vector, the adjusted horizontal scattering force vector, and the vertical scattering force vector as the offset vector.

In some embodiment, referring to FIG. 11, the first vector adjusting module 1002 includes a first vector adjusting unit 1012, configured to adjust the horizontal scattering force vector based on the ratio between the horizontal recoil force magnitude and the vertical recoil force magnitude to obtain the adjusted horizontal scattering force vector, in a case that the ratio between the horizontal recoil force magnitude and the vertical recoil force magnitude is less than a ratio threshold, the ratio threshold being less than 1.

In some embodiment, referring to FIG. 11, the vector generating module 1001 includes a vector generating unit 1011, configured to generate the horizontal recoil force vector, the vertical recoil force vector, the horizontal scattering force vector, and a vertical scattering force vector.

The apparatus may further include a historical scattering force vector obtaining module 1005, a vector determining module 1006, a second vector adjusting module 1007, and a second offset determining module 1008.

The historical scattering force vector obtaining module 1005 is configured to obtain a historical scattering force vector generated in a last shooting operation by the virtual prop, in a case that the ratio between the horizontal recoil force magnitude and the vertical recoil force magnitude is not less than the ratio threshold.

The vector determining module 1006 is configured to determine a vector sum of the horizontal recoil force vector and the vertical recoil force vector as a recoil force vector and determines a vector sum of the horizontal scattering force vector and the vertical scattering force vector as a scattering force vector.

The second vector adjusting module 1007 is configured to adjust the scattering force vector in a case that a distance between the scattering force vector and the historical scattering force vector is greater than a recoil force magnitude, so that a distance between the adjusted scattering force vector and the historical scattering force vector is not greater than the recoil force magnitude.

The second offset determining module 1008 is configured to determine a vector sum of recoil force vector and the adjusted scattering force vector as the offset vector of the virtual prop.

In some embodiments, referring to FIG. 11, the second vector adjusting module 1007 includes a coordinate point determining unit 1017, a circle generating unit 1027, and a second vector adjusting unit 1037.

The coordinate point determining unit 1017 is configured to map the scattering force vector to a first coordinate point, map the historical scattering force vector to a second coordinate point.

The circle generating unit 1027 is configured to generate a circle with the second coordinate point as a center and the recoil force magnitude as a radius.

The second vector adjusting unit 1037 is configured to adjust the scattering force vector in a case that the first coordinate point is located outside the circle, so that the distance between the adjusted scattering force vector and the historical scattering force vector is not greater than the recoil force magnitude.

In some embodiments, referring to FIG. 11, the coordinate point determining unit 1017 is configured to determine a horizontal coordinate based on the horizontal scattering force magnitude and the horizontal scattering force direction and determine a vertical coordinate based on the vertical scattering force magnitude and the vertical scattering force direction. The coordinate point determining unit 1017 is further configured to determine a coordinate point indicated by the horizontal coordinate and the vertical coordinate as the first coordinate point.

In some embodiments, referring to FIG. 11, the second vector adjusting unit 1037 is configured to generate a ray that starts at the second coordinate point and passes through the first coordinate point, in a case that the first coordinate point is located outside the circle. The second vector adjusting unit 1037 is further configured to map a point of intersection between the circle and the ray to be the adjusted scattering force vector.

In some embodiments, referring to FIG. 11, the second vector adjusting unit 1037 is configured to determine a corresponding horizontal coordinate and vertical coordinate of the point of intersection between the circle and the ray; determine an adjusted horizontal scattering force magnitude and horizontal scattering force direction based on the horizontal coordinate and form the adjusted horizontal scattering force magnitude and horizontal scattering force direction into the adjusted horizontal scattering force vector; determine an adjusted vertical scattering force magnitude and vertical scattering force direction based on the vertical coordinate and form the adjusted vertical scattering force magnitude and vertical scattering force direction into the adjusted vertical scattering force; and determine a vector sum of the adjusted horizontal scattering force vector and the adjusted vertical scattering force vector as the adjusted scattering force.

In some embodiments, referring to FIG. 11, the second vector adjusting unit 1037 is configured to generate a straight line that passes through the first coordinate point and the second coordinate point in a case that the first coordinate point is located outside the circle; and determine two points of intersection between the circle and the straight line, and map a point of intersection closer to the first coordinate point in the two points of intersection to be the adjusted scattering force vector.

In some embodiments, referring to FIG. 11, the aim point offset module 1004 includes a direction and magnitude determining unit 1014 and an aim point shifting unit 1024.

The direction and magnitude determining unit 1014 is configured to determine an offset direction and offset magnitude of the offset vector.

The aim point shifting unit 1024 is configured to shift the aim point of the virtual prop along the offset direction based on an offset size indicated by the offset magnitude.

It is to be understood that: when the virtual prop control apparatus provided in the foregoing embodiments controls the virtual object, division of the foregoing functional modules is merely used as an example for description. In the practical application, the functions may be allocated to and completed by different functional modules according to requirements. That is, an internal structure of a terminal is divided into different functional modules, to complete all or some of the functions described above. In addition, the virtual prop control apparatus provided in the foregoing embodiments belong to the same concept as the virtual prop control method embodiment. For a specific implementation process of the apparatus, refer to the method embodiment. Details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The embodiments of this disclosure further provide a terminal, including a processor and a memory, the memory storing at least one computer program, the at least one computer program being loaded and executed by the processor to implement the operations in the virtual prop control method according to any of the foregoing embodiments.

Figure 12:
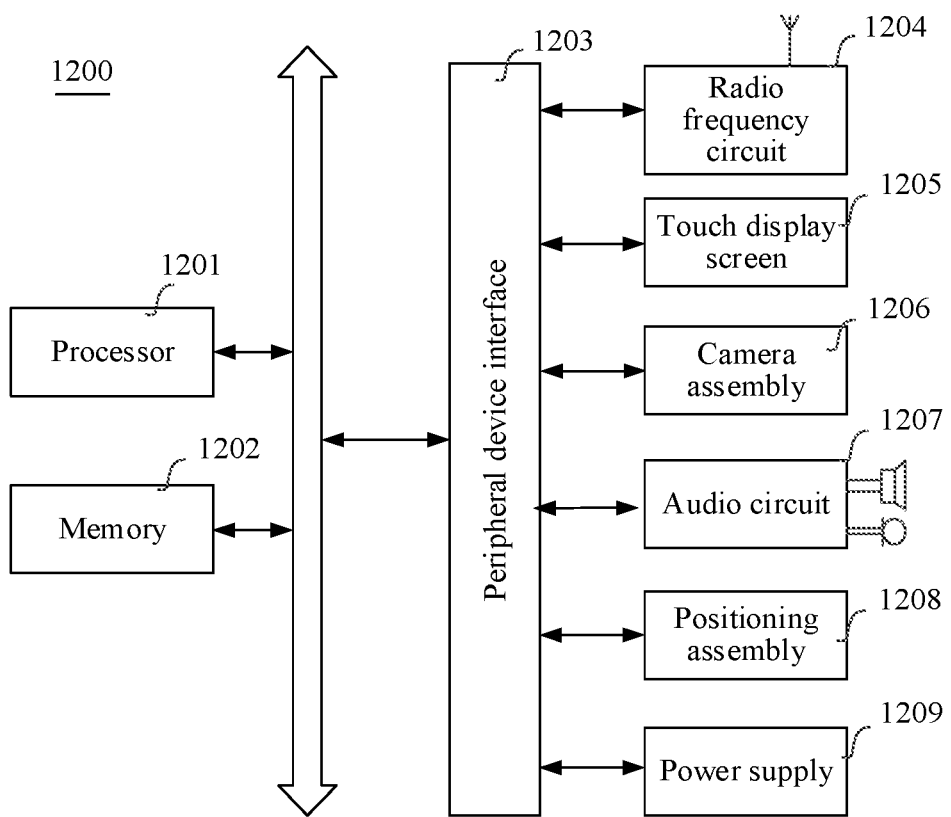
FIG. 12 is a schematic structural diagram of a terminal according to an embodiment of the present disclosure.

FIG. 12 is a schematic structural diagram of a terminal 1200 according to an embodiment of the present disclosure.

The terminal 1200 includes: a processor 1201 and a memory 1202.

Processing circuitry, such as the processor 1201, includes one or more processing cores, for example, a 4-core processor and an 8-core processor. The processor 1201 can be implemented by using at least one hardware form of a digital signal processor (DSP), a field-programmable gate array (FPGA), and a programmable logic array (PLA). The processor 1201 can alternatively include a main processor and a coprocessor. The main processor is configured to process data that is in an active state (CPU); the coprocessor is a low-power processor configured to process data that is in a standby state. In some embodiments, the processor 1201 can be integrated with a graphics processing unit (GPU). The GPU is configured to render and draw content that needs to be displayed on a display screen. In some embodiments, the processor 1201 can further include an artificial intelligence (AI) processor. The AI processor is configured to process computing operations related to machine learning.

The memory 1202 can include one or more computer-readable storage media that can be non-transitory. The memory 1202 can further include a high-speed random access memory and a non-volatile memory, such as, one or more disk storage devices or flash storage devices. In some embodiments, the non-transitory computer-readable storage medium in the memory 1202 is configured to store at least one computer program, the at least one computer program being executed by the processor 1201 to implement the virtual prop control method provided in the method embodiments of this disclosure.

In some embodiments, the terminal 1200 can include: a peripheral device interface 1203 and at least one peripheral device. The processor 1201, the memory 1202, and the peripheral device interface 1203 can be connected through a bus or a signal cable. Each peripheral device may be connected to the peripheral device interface 1203 through a bus, a signal cable, or a circuit board. In some embodiments, the peripheral device includes: at least one of a radio frequency circuit 1204, a touch display screen 1205, a camera assembly 1206, an audio circuit 1207, a positioning assembly 1208, and a power supply 1209.

A person skilled in the art may understand that the structure shown in FIG. 12 constitutes no limitation on the terminal 1200, and the terminal may include more or fewer components than those shown in the figure, or some components may be combined, or a different component deployment may be used.

The embodiments of this disclosure further provide a computer-readable storage medium, storing at least one computer program being loaded and executed by a processor to implement the operations in the virtual prop control method according to any of the foregoing embodiments.

The embodiments of this disclosure further provide a computer program product or a computer program, the computer program product or computer program including computer program code, the computer program code being stored in a computer-readable storage medium. A processor of a terminal reads the computer program code from the computer-readable storage medium and executes the computer program code, so that the terminal implements the operations in the virtual prop control method according to any of the foregoing embodiments.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely exemplary embodiments of the disclosure, and are not intended to limit the embodiments of this disclosure. Any modification, equivalent replacement, or improvement made within the spirit and principle of the embodiments of this disclosure shall fall within the scope of this disclosure.

What is claimed is:

1. A virtual aiming control method, comprising:
obtaining a recoil offset for an aim point of a virtual item when a shooting operation is performed by the virtual item;
determining a scatter offset for the aim point of the virtual item based on the obtained recoil offset for the aim point of the virtual item;
determining an aim point offset for the aim point of the virtual item based on the obtained recoil offset for the aim point of the virtual item and the determined scatter offset for the aim point of the virtual item; and
shifting the aim point of the virtual item based on the aim point offset.

2. The method according to claim 1, wherein the determining the scatter offset comprises:
determining the scatter offset for the aim point of the virtual item based on a recoil offset ratio of (i) a first recoil offset component of the recoil offset along a first axis and (ii) a second recoil offset component of the recoil offset along a second axis, the first axis being perpendicular to the second axis.

3. The method according to claim 2, wherein the determining the scatter offset comprises:

determining an initial scatter offset for the aim point of the virtual item, the initial scatter offset including at least one of a first scatter offset component along the first axis or a second scatter offset component along the second axis; and determining the scatter offset for the aim point of the virtual item based on a product of the recoil offset ratio and one of the at least one first scatter offset component or the second scatter offset component.

4. The method according to claim 3, wherein
the first recoil offset component along the first axis is less than the second recoil offset component along the second axis, and
the determining the scatter offset includes determining the scatter offset for the aim point of the virtual item based on a product of the recoil offset ratio and the first scatter offset component along the first axis.

5. The method according to claim 1, wherein the determining the scatter offset comprises:
determining the scatter offset for the aim point of the virtual item based on a recoil offset ratio of (i) a first offset component of the recoil offset along a first axis and (ii) a second offset component of the recoil offset along a second axis when the recoil offset ratio is less than a ratio threshold, the first axis being perpendicular to the second axis.

6. The method according to claim 5, wherein the determining the aim point offset comprises:
determining the aim point offset for the aim point of the virtual item based on a magnitude of the recoil offset when the recoil offset ratio is greater than or equal to the ratio threshold.

7. The method according to claim 6, wherein a magnitude of the aim point offset is set to the magnitude of the recoil offset and a direction of the aim point offset is maintained when the magnitude of the aim point offset is greater than the magnitude of the recoil offset.

8. The method according to claim 1, wherein the determining the aim point offset comprises:
determining the aim point offset for the aim point of the virtual item as a sum of the obtained recoil offset for the aim point of the virtual item and the determined scatter offset for the aim point of the virtual item.

9. The method according to claim 1, wherein
the recoil offset for the aim point of the virtual item includes a first recoil offset component along a first axis and a second recoil offset component along a second axis, the first axis being perpendicular to the second axis, the first recoil offset component being less than the second recoil offset component, and
the determining the scatter offset for the aim point of the virtual item includes determining a scatter offset component of the scatter offset along the first axis based on the recoil offset.

10. The method according to claim 1, the determining the scatter offset comprises:
determining an initial scatter offset; and
decreasing a scatter offset component of the initial scatter offset along one of a first axis and a second axis based on a ratio of a first offset component and a second offset component of the recoil offset, the first axis being perpendicular to the second axis.

11. The method according to claim 1, wherein
a horizontal offset component of the recoil offset is less than a vertical offset component of the recoil offset, and
the determining the scatter offset includes determining a horizontal offset component of the scatter offset for the aim point of the virtual item based on a ratio of the horizontal offset component of the recoil offset and the vertical offset component of the recoil offset.

12. A virtual aiming control apparatus, comprising:
processing circuitry configured to:
obtain a recoil offset for an aim point of a virtual item when a shooting operation is performed by the virtual item;
determine a scatter offset for the aim point of the virtual item based on the obtained recoil offset for the aim point of the virtual item;
determine an aim point offset for the aim point of the virtual item based on the obtained recoil offset for the aim point of the virtual item and the determined scatter offset for the aim point of the virtual item; and
shift the aim point of the virtual item based on the aim point offset.

13. The virtual aiming control apparatus according to claim 12, wherein the processing circuitry is configured to:
determine the scatter offset for the aim point of the virtual item based on a recoil offset ratio of (i) a first recoil offset component of the recoil offset along a first axis and (ii) a second recoil offset component of the recoil offset along a second axis, the first axis being perpendicular to the second axis.

14. The virtual aiming control apparatus according to claim 13, wherein the processing circuitry is configured to:
determine an initial scatter offset for the aim point of the virtual item, the initial scatter offset including at least one of a first scatter offset component along the first axis or a second scatter offset component along the second axis; and
determine the scatter offset for the aim point of the virtual item based on a product of the recoil offset ratio and one of the at least one first scatter offset component or the second scatter offset component.

15. The virtual aiming control apparatus according to claim 14, wherein
the first recoil offset component along the first axis is less than the second recoil offset component along the second axis, and
the processing circuitry is configured to determine the scatter offset for the aim point of the virtual item based on a product of the recoil offset ratio and the first scatter offset component along the first axis.

16. The virtual aiming control apparatus according to claim 12, wherein the processing circuitry is configured to:
determine the scatter offset for the aim point of the virtual item based on a recoil offset ratio of (i) a first offset component of the recoil offset along a first axis and (ii) a second offset component of the recoil offset along a second axis when the recoil offset ratio is less than a ratio threshold, the first axis being perpendicular to the second axis.

17. The virtual aiming control apparatus according to claim 16, wherein the processing circuitry is configured to:
determine the aim point offset for the aim point of the virtual item based on a magnitude of the recoil offset when the recoil offset ratio is greater than or equal to the ratio threshold.

18. The virtual aiming control apparatus according to claim 17, wherein a magnitude of the aim point offset is set to the magnitude of the recoil offset and a direction of the aim point offset is maintained when the magnitude of the aim point offset is greater than the magnitude of the recoil offset.

19. The virtual aiming control apparatus according to claim 12, wherein the processing circuitry is configured to:
  determine the aim point offset for the aim point of the virtual item as a sum of the obtained recoil offset for the aim point of the virtual item and the determined scatter offset for the aim point of the virtual item.

20. A non-transitory computer-readable storage medium, storing instructions which when executed by a processor cause the processor to perform:
  obtaining a recoil offset for an aim point of a virtual item when a shooting operation is performed by the virtual item;
  determining a scatter offset for the aim point of the virtual item based on the obtained recoil offset for the aim point of the virtual item;
  determining an aim point offset for the aim point of the virtual item based on the obtained recoil offset for the aim point of the virtual item and the determined scatter offset for the aim point of the virtual item; and
  shifting the aim point of the virtual item based on the aim point offset.

* * * * *